United States Patent
Callender

(10) Patent No.: US 7,849,364 B2
(45) Date of Patent: Dec. 7, 2010

(54) KERNEL-MODE IN-FLIGHT RECORDER TRACING MECHANISM

(75) Inventor: Robin L. Callender, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 11/069,786

(22) Filed: Mar. 1, 2005

(65) Prior Publication Data

US 2006/0200701 A1 Sep. 7, 2006

(51) Int. Cl.
G06F 11/00 (2006.01)
(52) U.S. Cl. ......................................................... 714/38
(58) Field of Classification Search .................. 714/38, 714/44
See application file for complete search history.

(56) References Cited

U.S. PATENT DOCUMENTS

| | | | | |
|---|---|---|---|---|
| 5,590,277 A * | 12/1996 | Fuchs et al. | ................ | 714/38 |
| 5,611,044 A * | 3/1997 | Lundeby | .................... | 714/38 |
| 5,809,303 A * | 9/1998 | Senator | ..................... | 719/325 |
| 5,938,778 A * | 8/1999 | John et al. | .................... | 714/45 |
| 5,941,995 A * | 8/1999 | Morrison | ..................... | 714/39 |
| 5,958,049 A * | 9/1999 | Mealey et al. | ................. | 713/1 |
| 6,047,124 A * | 4/2000 | Marsland | ..................... | 717/128 |
| 6,154,857 A * | 11/2000 | Mann | .......................... | 714/30 |
| 6,282,701 B1 * | 8/2001 | Wygodny et al. | ........... | 717/125 |
| 6,314,530 B1 * | 11/2001 | Mann | .......................... | 714/38 |
| 6,442,433 B1 * | 8/2002 | Linberg | ...................... | 607/60 |
| 6,526,567 B1 * | 2/2003 | Cobbett et al. | .............. | 717/124 |
| 6,757,837 B1 * | 6/2004 | Platt et al. | ....................... | 714/4 |
| 6,788,218 B2 * | 9/2004 | Sudolcan | ............... | 340/870.16 |
| 6,950,863 B1 * | 9/2005 | Pham et al. | ................. | 709/221 |
| 6,950,964 B1 * | 9/2005 | McMichael et al. | .......... | 714/38 |
| 6,971,048 B1 * | 11/2005 | Hanson et al. | ................ | 714/41 |
| 7,028,308 B2 * | 4/2006 | Kim | .......................... | 719/321 |
| 7,058,927 B2 * | 6/2006 | Yenne et al. | ................ | 717/128 |
| 7,232,063 B2 * | 6/2007 | Fandel et al. | ................ | 235/383 |
| 7,278,058 B1 * | 10/2007 | Narisi | ......................... | 714/38 |
| 7,284,157 B1 * | 10/2007 | McMichael et al. | .......... | 714/38 |
| 7,293,203 B1 * | 11/2007 | Coatney et al. | .............. | 714/42 |
| 7,735,060 B2 * | 6/2010 | Harvey et al. | ............... | 717/107 |
| 2002/0138788 A1 * | 9/2002 | Yenne et al. | ................. | 714/38 |
| 2004/0098640 A1 * | 5/2004 | Smith | .......................... | 714/39 |
| 2005/0114085 A1 * | 5/2005 | Nakazawa et al. | .......... | 702/184 |
| 2006/0200701 A1 * | 9/2006 | Callender | .................... | 714/38 |
| 2009/0193298 A1 * | 7/2009 | Mukherjee | ................... | 714/38 |

* cited by examiner

*Primary Examiner*—Philip Guyton
*Assistant Examiner*—Amine Riad
(74) *Attorney, Agent, or Firm*—Wolf, Greenfield & Sacks, P.C.

(57) ABSTRACT

The subject invention relates to systems and methods that automatically monitor and record component-related activities to support remote diagnostic capabilities. In one aspect, an automated computer diagnostic system is provided. The system includes a trace component that monitors computer-related activities between a driver and an operating system component. The trace component can be embedded within the driver or coupled thereto but, generally records activities relating to a given driver in contrast to generically for the entire operating system. A log records the computer-related activities to facilitate problem diagnosis with respect to the driver or the operating system component.

13 Claims, 9 Drawing Sheets

KERNEL-MODE IN-FLIGHT RECORDER TRACING MECHANISM

TECHNICAL FIELD

The subject invention relates generally to computer systems, and more particularly, relates to systems and methods that enable remote debug of system driver components and/or systems by employing light-weight capture mode components that are embedded within or associated with the driver components.

BACKGROUND OF THE INVENTION

Operating system platforms have enabled the rapid growth of various technologies that are developed on such systems. Many of these platforms along with running many differing applications for developing the technologies also have become much easier to use when adding components such as hardware devices and associated drivers to the systems. For instance, in one area, some systems allow hardware or software components to be installed on the respective platforms, whereby these components in essence can be plugged into the system with a high degree of confidence that they will also cooperate with the system and other devices/components that have been previously installed. One common name for such technology is referred to as Plug and Play technology which enables devices or components to be easily integrated within an existing system.

Plug and Play technology generally relates to when a computer system automatically recognizes new devices and determines what driver software, resource settings, and so forth the device needs with very little or no interaction from the user. This technology also will typically only load a driver if it is needed since the hardware is currently detected as present. A driver is a software component that resides in between the operating system and the hardware and allows the operating system to communicate with the hardware. In some operating systems, "drivers" are software modules that can be inserted into an operating system kernel, allowing for support of specific hardware or for extension of the operating system or both. Generally, drivers run in a fully trusted mode, whereby any failure in these components can cause machine services to fail, or a full system crash. Thus, any successful effort to make drivers more resilient or fault tolerant usually causes greater system reliability and consequently customer satisfaction to increase.

One of the barriers to greater driver resilience is that a driver typically has to respond to many "events" generated by the operating system which may require the driver to initiate operations which can fail. For example, these events may be file handle creation, device insertion, power being turned off, statistics gathering, and so forth. Most of the time, the exact action that a driver should take in response to an internal failure is poorly defined. This is partly due to the operating system not always being designed to handle every conceivable set of failures, partly due to external documentation not covering every situation and partly due to certain failures that involve a large amount of judgment on the part of the driver designer. Furthermore, drivers are often constructed internally as large "state machines" wherein a response to an event can depend largely on which events have occurred in the past. After a failure occurs, the driver designer often has to immediately turn around and handle new events, even though the failure probably implies that new events are likely to fail as well.

Currently, some vendors are facing difficulties in their ability to respond to the number of system crashes which are witnessed as Blue-Screens by users in some situations. Many of these crashes may be caused by faulty kernel-mode drivers, for example. The current information collected from these system crashes (held in a mini-dump) generally does not contain any significant event history or trace logs. This often results in the mini-dump not providing sufficient information to resolve the problem—especially with respect to the driver itself. The investigators must then either wait for similar mini-dump to be submitted to support personnel or ask effected users to reproduce the problem under more controlled environments—which users are often reluctant to engage in.

While one current tracing infrastructure is quite rich in many of its capabilities, it does not provide sufficient support in key areas when applied to kernel-mode drivers. For instance, one debug model is largely premised on support personnel turning it on when needed, e.g., it usually is not active when the user's system crashes. In another case, a system trace logger (event capture component) often presents more processing overhead than most developers of device drivers want to incur. Finally, when a system crashes due to a faulty driver, the current debug infrastructure does not include its trace logs in the mini-dump.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that capture or record component-related activities outside the domain of standard operating system provisions in order to facilitate efficient diagnosis and repair of computer-related problems. In one aspect, a trace component is embedded within or associated with kernel-mode drivers to supply a light-weight (e.g., low overhead to the driver), always-on software tracing capability that captures driver-related activities in more detail such as event history, for example. In this manner, during operations of the driver, events leading up to a driver or system crash can be recorded in a log that can be analyzed at a later time for diagnosis and repair of computer-related problems. Since the tracing occurs during operations of the driver, and the data captured before a problem occurs is later analyzed to solve a "computer crash", the capturing of such data can be analogized to an In-Flight Recorder that is employed to determine the cause of an "airplane crash." Thus, the tracing component and the on-going capture of such data of the subject invention can also be referred to as an In-Flight Recorder (IFR) for drivers or other components that interact with an operating system.

In one aspect, the driver In-Flight Recorder (IFR) provides an always-on, compact event history log (e.g., trace log) to be embedded within or associated with a driver. The IFR log can be captured in system mini-dumps, for example, when the driver crashes. Thus, the analyst investigating the mini-dump can have much more relevant diagnostic information at their disposal and do not have to ask users to reproduce the circumstances leading up to a given crash. Often, one mini-dump containing an IFR log can be sufficient to solve the driver's problem by providing the relevant information to understand and subsequently repair a particular problem. This leads to quicker resolution of driver-related problems and facilitates a trend toward a more stable collection of device drivers running on an operating system. In one example, the IFR can leverage off existing system tracing infrastructures to facilitate the maintenance of software and lessen the retraining required for support personnel. In addition to providing support personnel with a new support tool, driver developers may also use the IFR facilities as part of their driver development. By enabling debugger tools to access and display IFR trace records for a driver-under-test, the developer may also more quickly detect race-conditions and other unintended events that the respective driver may be subject to.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that automatically monitor and record driver or component-related activities to support remote diagnostic capabilities. In one aspect, an automated computer diagnostic system is provided. The system includes a trace component that monitors computer-related activities (e.g., events, instructions, messages) between a driver and an operating system component such as a framework library that may interact with the driver. The trace component can be embedded within the driver or coupled thereto but, generally records activities relating to a given driver in contrast to generically for the entire operating system. A log records the computer-related activities to facilitate problem diagnosis with respect to the driver or the operating system component. In this manner, support personal can generally solve a software-related problem from the log while mitigating efforts of users to reproduce such problems.

As used in this application, the terms "component," "system," "object," "threshold," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
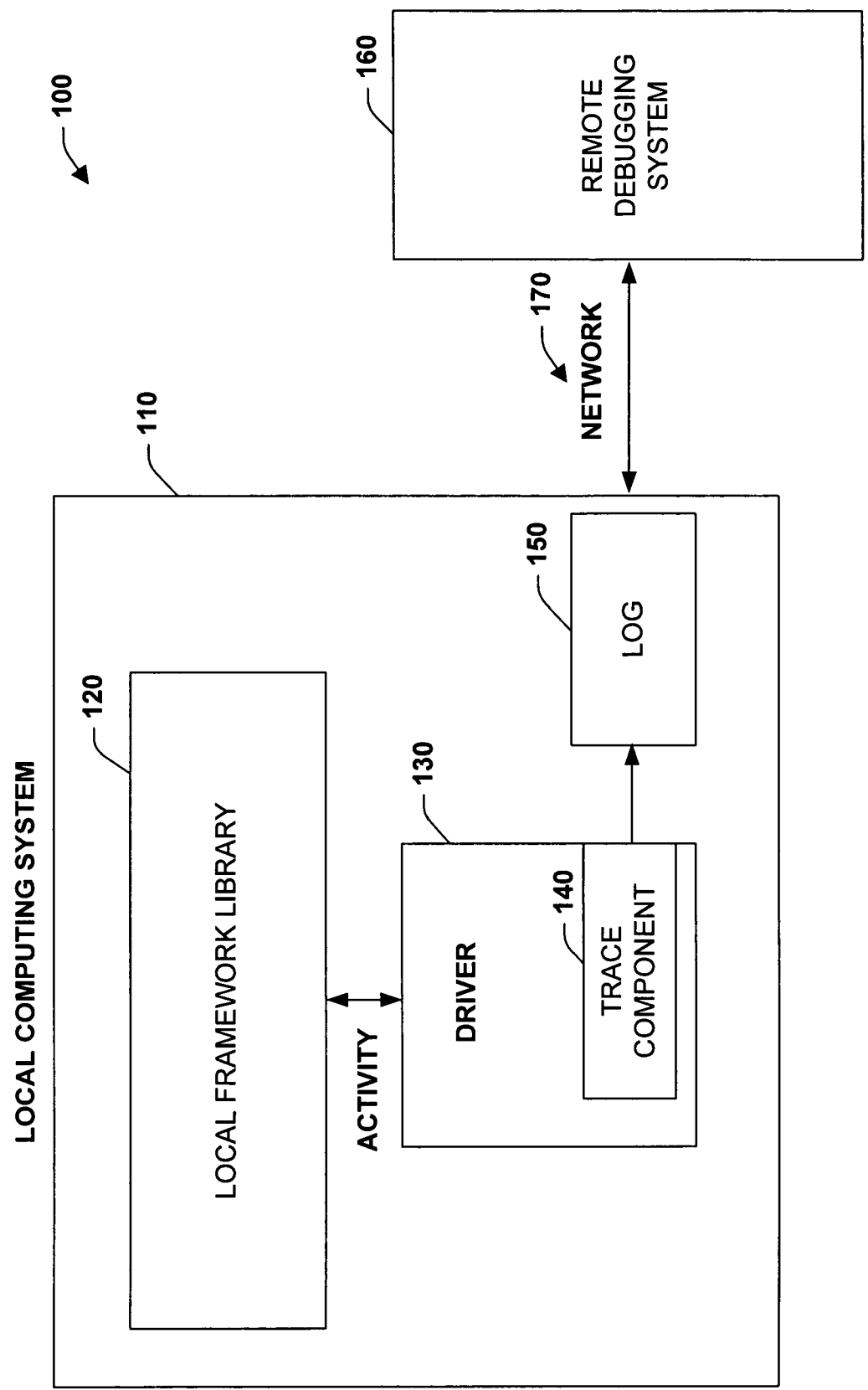
FIG. 1 is a schematic block diagram illustrating an automated diagnostic system in accordance with an aspect of the subject invention.

Referring initially to FIG. 1, an automated diagnostic system 100 is illustrated in accordance with an aspect of the subject invention. The system 100 includes a local computing system 110 that operates components such as an operating system (not shown) and a local framework library 120 that may support one or more drivers 130. The driver 130 employs a trace component to monitor activities of the driver and with respect to the local framework library 120 (or other component of the computer system 110). As will be described in more detail below, the trace component 140 can monitor such activities as system or driver events, bus activities, instruction or command sequences, message activity between the driver and the framework, and so forth. A log 150 records output from the trace component 140 and collectively forms an In-flight Recorder (IFR) with the trace component to facilitate automatic diagnosis of driver and/or system problems.

The log 150 can be substantially any size within reasonable limits of the computer system 110 but generally is provided as a limited buffer that operates in a circular manner. Thus, as the trace component 140 inputs new information into the log 150, older and more stale information is purged or overwritten in favor of the new information. In this manner, the events that are most likely to have caused a driver or system problem are captured for later analysis and debug. In the event of a system or driver crash, the log 150 can be transmitted to a remote debugging system 160 over a network 170. It is noted that the log 150 can be written to a file for archival purposes and subsequent post-processing of the log contents. As will be described in more detail below, the log 150 can be analyzed according to a plurality of manual and/or automated techniques at the remote system 160. These may include employment of user interfaces or other components to assist users in analyzing the log 150 and subsequently repairing problems that may be indicated therein. In another aspect, the trace component 140 and log 150 can be adapted to utilize existing computer system 110 infrastructure to facilitate light-weight installation and deployment of the IFR. It is to be appreciated that tracing and recording elements of the subject invention can also be implemented separately from associated system constraints as well.

Figure 2:
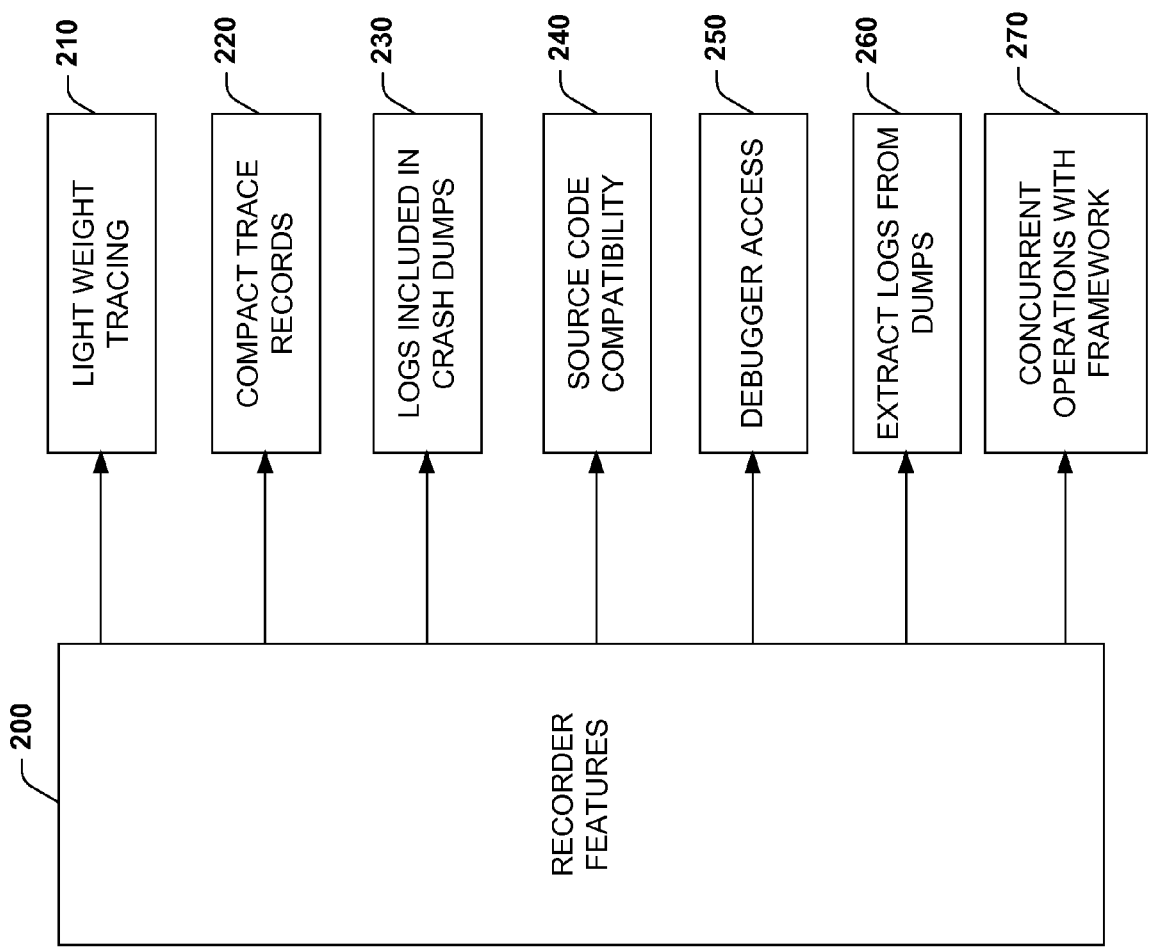
FIG. 2 illustrates example in-flight recording features in accordance with an aspect of the subject invention.

Referring now to FIG. 2, example in-flight recording features 200 are illustrated in accordance with an aspect of the subject invention. In this aspect of the subject invention, higher-level functional aspects of an In-Flight Recording (IFR) component are described. Generally, the IFR component extends the current tracing paradigms to include an always-on, embedded In-Flight Recorder (IFR) for in kernel-mode driver components, for example. The In-Flight Recorder tracing model described herein can be implemented in a Windows Driver Foundation (WDF) support for WDF-based drivers in one specific example of the subject invention although other implementations are possible as can be appreciated.

Some of the functional aspects of the IFR adapted in accordance with the subject invention include: Light-weight tracing capabilities at 210. For instance, IFR tracing overhead is less than that of operating system tracing support mechanisms. In another aspect, compact trace records are maintained at 220. In general, IFR trace records are smaller in length due to driver specificity and therefore more messages can be captured in a given sized log buffer. At 230, driver logs can be included in system crash dumps, where the IFR log can be captured in substantially all forms of system dumps including mini-dumps. At 240, the IFR can be adapted as source code compatible with existing infrastructures (e.g., WPP infrastructure). Also, IFR trace statements can be source compatible with existing system trace statements, if desired. Thus, source code related to tracing does not have to be modified to incorporate IFR logging. Also, developer documentation for IFR can essentially remain consistent with existing documentation, if desired.

At 250, debugger access is provided to IFR Logs. Thus, a developer may access a driver's unique IFR logs via a debugger extension designated in accordance with a respective driver. This extension can format the IFR records via the same (or different) formatting facilities as existing systems. This facilitates developers who already know how to read and understand trace listings. At 260, support personnel investigating crash dumps can extract the IFR log from a dump to diagnose a particular driver and is also useful for mini-dumps. At 270, the IFR may operate concurrently with an existing framework (e.g., WPP, WDF). While IFR is generally "always-on", it is possible to also activate conventional system tracing for the same driver. The system trace could provide a lengthier event history and more selectivity in captured events, if desired.

Figure 3:
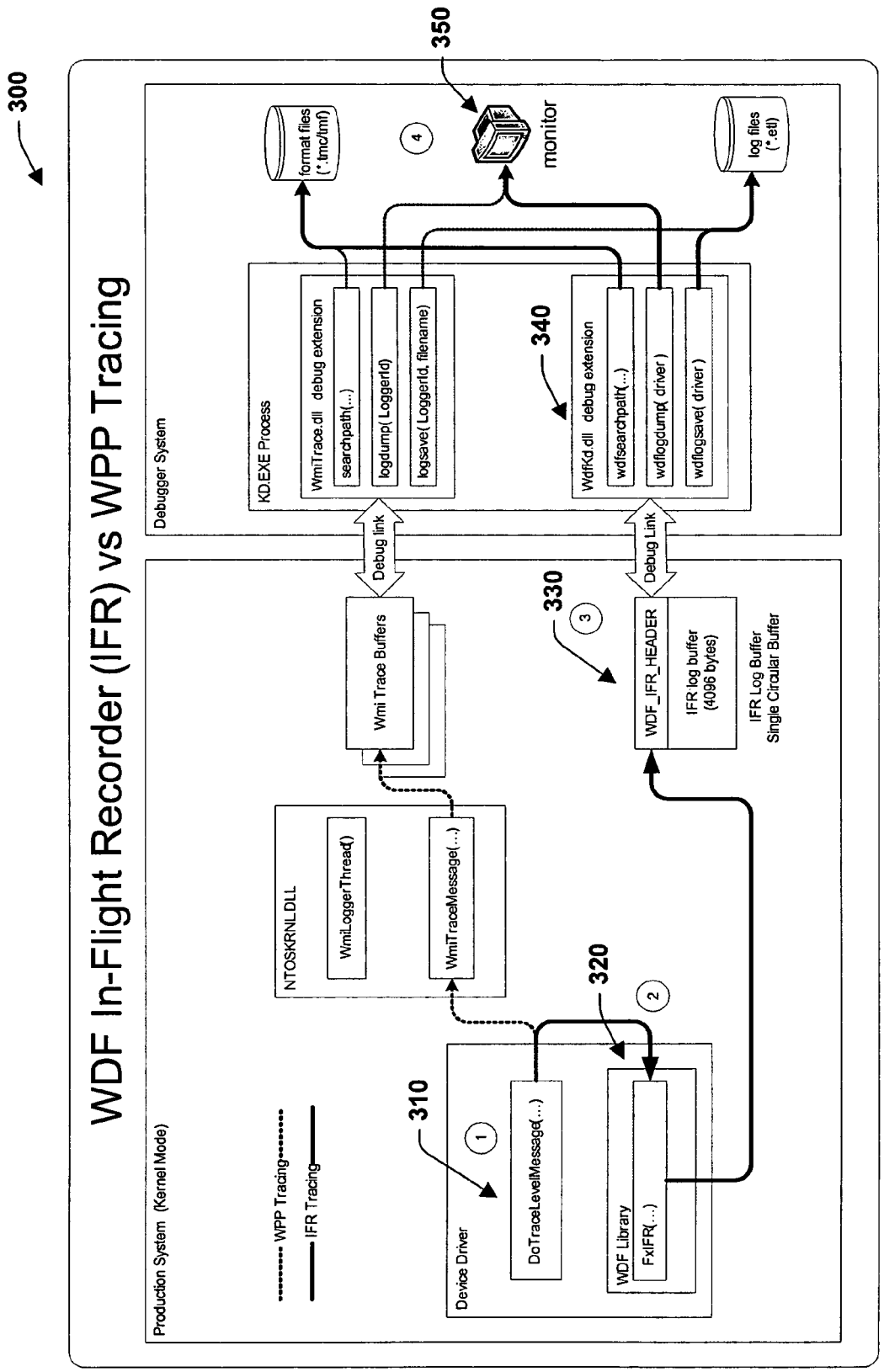
FIG. 3 illustrates an example in-flight recorder system in accordance with an aspect of the subject invention.

Turning to FIG. 3, an example in-flight recorder system 300 is illustrated in accordance with an aspect of the subject invention. Before proceeding, it is noted that the system 300 shows one particular implementation of the concepts described herein. It is to be appreciated that substantially any driver component that cooperates with a recorder/trace mechanism and subsequently logs the information for later inspection and further analysis is within the scope of the present invention. The system 300 can include an in-flight recorder (IFR) that can be expressed in an e.g., Windows Driver Foundation framework (WDF) including several processing areas as shown in FIG. 3. The following description describes these functional areas which include: WPP (Web Presence Provider) trace message embedding and a call setup to FxIFR, an event capture function; an FxIFR logger; and a WDF Debug Extension, e.g., Wdfkd.dll.

The system 300 graphically shows the relationship between the components as well as the In-Flight Recorder's relationship to standard tracing. One goal of the IFR is to provide some "recent history" of events for both developers and support personnel. The IFR logger is created and initialed as part of the WDF environment initialization, which generally occurs prior to the WDF driver's DriverEntry being passed control. As an IFR logger is created on a per-driver-instance basis, the events captured are unique to that driver, whereby the respective IFR log instance is generally not shared with other drivers.

In the driver, event trace statements are written to the WPP format (or other format). A WPP event trace statement illustrated at 310 when compiled will have two internal functional subsections. The first of these internal sections handles the standard WPP event tracing. The second internal section, added for IFR support, is an unconditional call to the IFR event capture function: FxIFR at 320. Thus, while the event may be conditionally logged to the WPP logger, the event should always be logged to an IFR logger at 330. The IFR log 330 is maintained as a circular buffer, usually of 4096 bytes in size, e.g., one i386 page. This size allows for the capture of about the last 100 events emitted by the driver.

It is noted that the IFR logger function can be embedded in the WPP trace statement, if desired. While WPP logger statements are conditionally logged according to the preferences of the attached loggers, the IFR trace logs all/most events. The IFR logger function 320 typically captures the same argument data as WPP tracing but the actual log record format is generally more compact than those of WPP logs. The IFR logger, F=IFR 320, has as short execution path (light-weight), more so than WPP logging, as it generally only has to manage a single log buffer. Events are logged to the IFR log 330 for as long as the driver is active.

Contents may be examined in several ways when the system is attached to a kernel-mode debugger at 340. The IFR log 330 may be dumped to a debug console 350 interactively or the log may be transferred to the debug console system and saved as a standard WPP trace capture file (identified with the *.etl file extension). Saved IFR capture files are viewable via standard WPP trace viewing tools such as TraceFmt.exe, TraceView.exe and LogMon.exe, for example. The typical saved IFR log file is on the order of 10-20 K bytes in size and easily e-mailed as an attachment. Another attractive benefit for the IFR log 330 is to be included in any mini-dump generated as a result of a system crash. The current IFR log size of 4096 bytes is a reasonably-sized addition to the mini-dump and may greatly assist in solving many system and/or driver-related problems.

Figure 4:
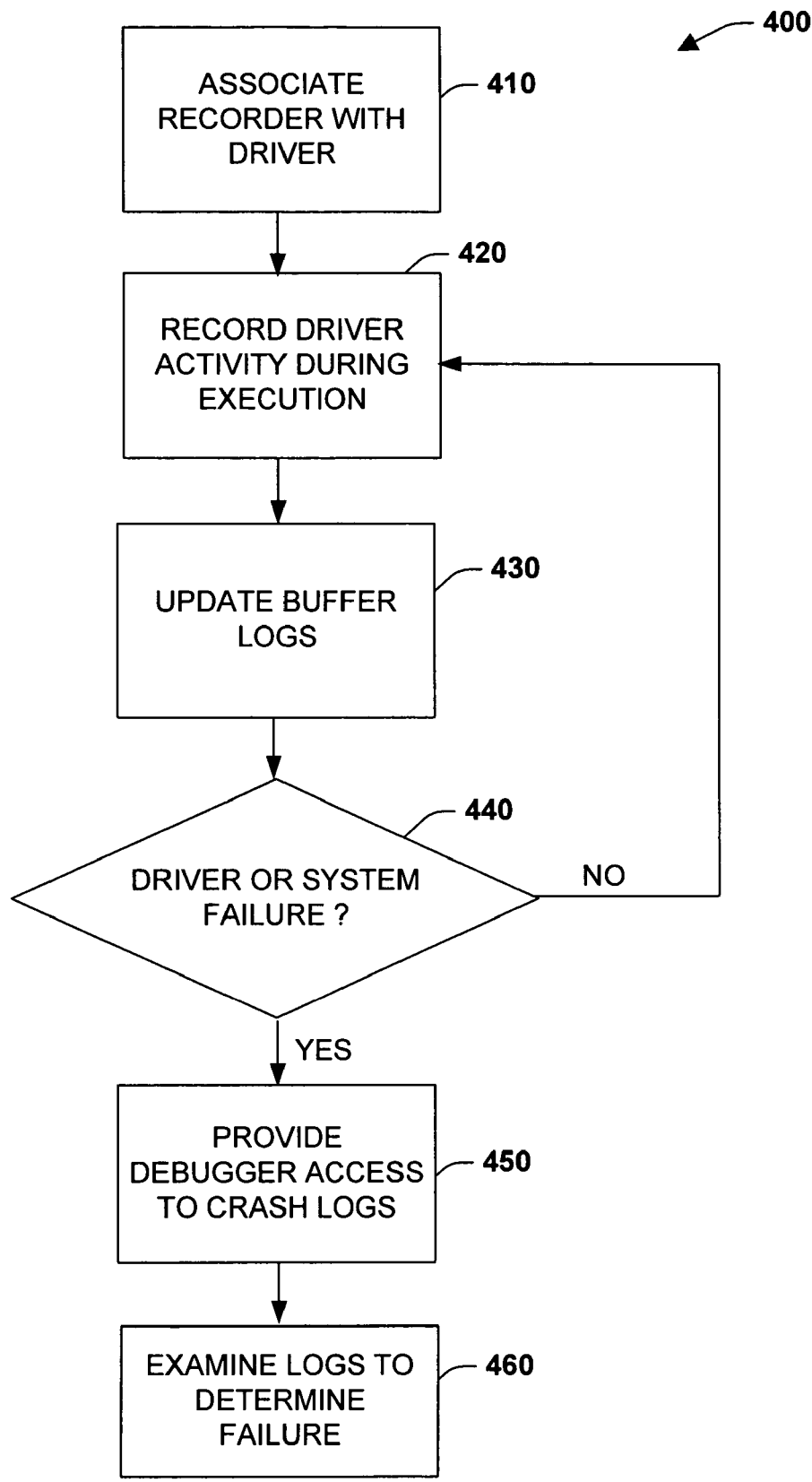
FIG. 4 illustrates an example recording process for diagnostic data capture in accordance with an aspect of the subject invention.
Figure 5:
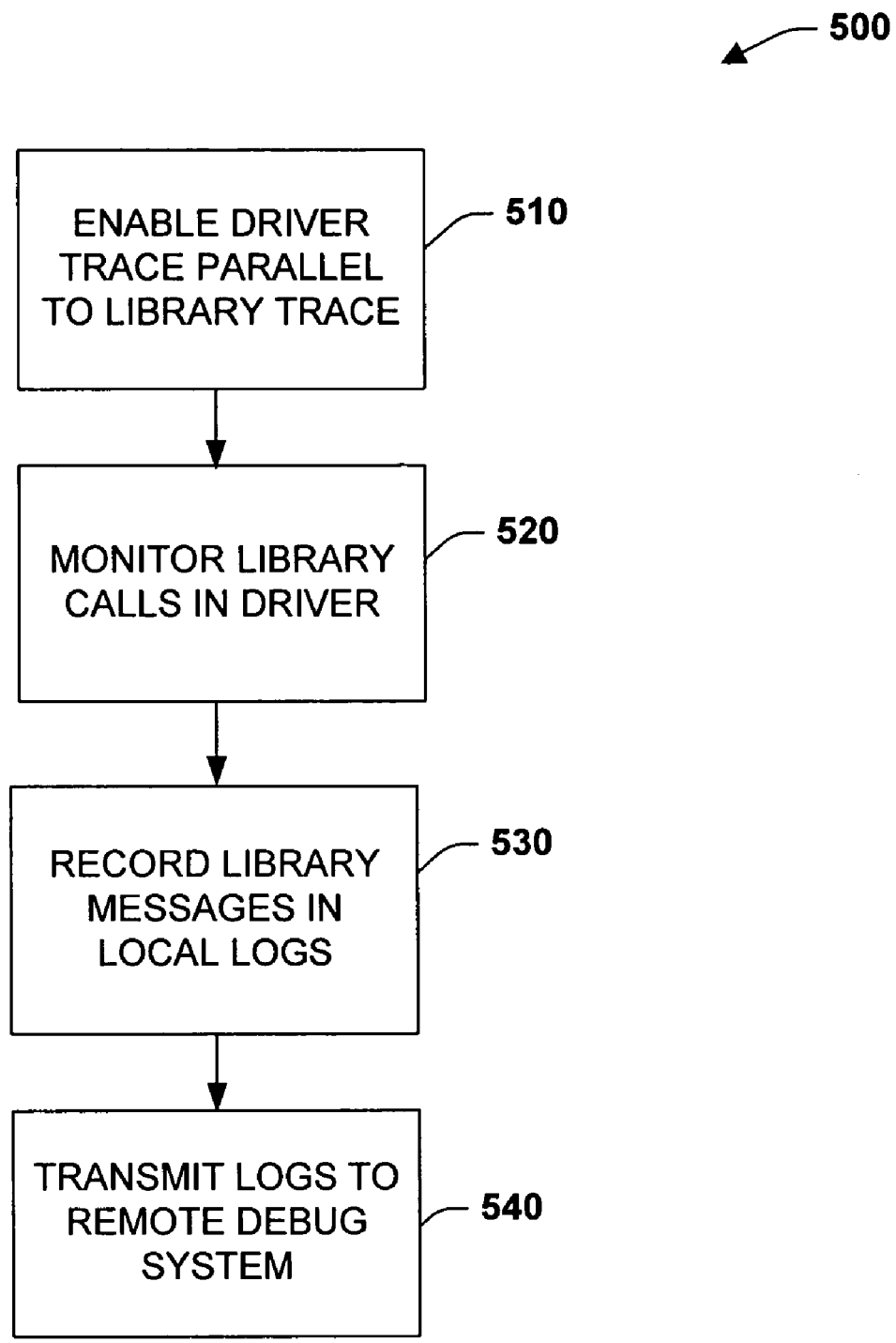
FIG. 5 illustrates an example system interaction process for diagnostic data capture in accordance with an aspect of the subject invention.

FIGS. 4 and 5 illustrate example automated diagnostic and capture processes for computer systems in accordance with an aspect of the subject invention. While, for purposes of simplicity of explanation, the methodologies are shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 4 illustrates an example recording process 400 for diagnostic data capture in accordance with an aspect of the subject invention. Proceeding to 410, a recording element or trace component is associated with a driver. As noted above, the recorder can be embedded within the context of the driver itself or operate as an external element that cooperates with the driver. At 420, during execution of the driver, the recording element defined at 410 traces or records activities of the driver. These can include instructions, bus activities, operating system interactions, status, and/or events that occur during operation of the system and/or the driver. At 430, the captured events or traces are stored in a log. This log can include a circular type of file or buffer, whereby older captured trace events are continually overwritten in the log by newer events.

At 440, if there is no driver or system failure, the process proceeds back to 420 to continue and capture/record driver events. In the event of a driver or system failure at 440, the process proceeds proceed to 450. At 450, the log or buffer is provided to a remote system for analysis. This can include making the log inspect-able from the remote location or can include transmitting the log to the remote location for further analysis. At 460, the log can be inspected manually to determine the cause of the driver failure and/or automated processes can be applied to the log to potentially diagnose and fix problems without manual intervention. For instance, this could include automated error code analysis, statistical analysis, artificial intelligence analysis, and so forth (e.g., automatically determine failure is result of inconsistent code revision levels between driver and system and automatically transmit a code update).

FIG. 5 illustrates an example system interaction process 500 for diagnostic data capture in accordance with an aspect of the subject invention. In this aspect, processes for remote diagnostic capabilities are illustrated in context of a capture component operating in accordance with existing system processes such as with existing system infrastructure to process generic system problems in contrast to driver specific problems of the subject invention. Proceeding to 510, a driver tracing element is enabled in parallel to existing system components such as a generic framework capturing component. At 520, all calls that are made to the library component driver are monitored during driver execution. At 530, monitored calls are recorded in a local log that is associated with the driver rather than a generic system log. In this manner, peculiarities relating to driver-specific activities are captured in conjunction with high-level system activities stored in generic or system logs. At 540, information captured in the local logs can be transmitted to subsequent systems for further analysis. As noted above, contents of the local logs generated by a given driver can be incorporated with generic system logs in order to provide driver-related information that is not provided in the generic system logs (e.g., dump contents of local driver log as part of a mini-dump separate from contents of overall system dump).

Figure 6:
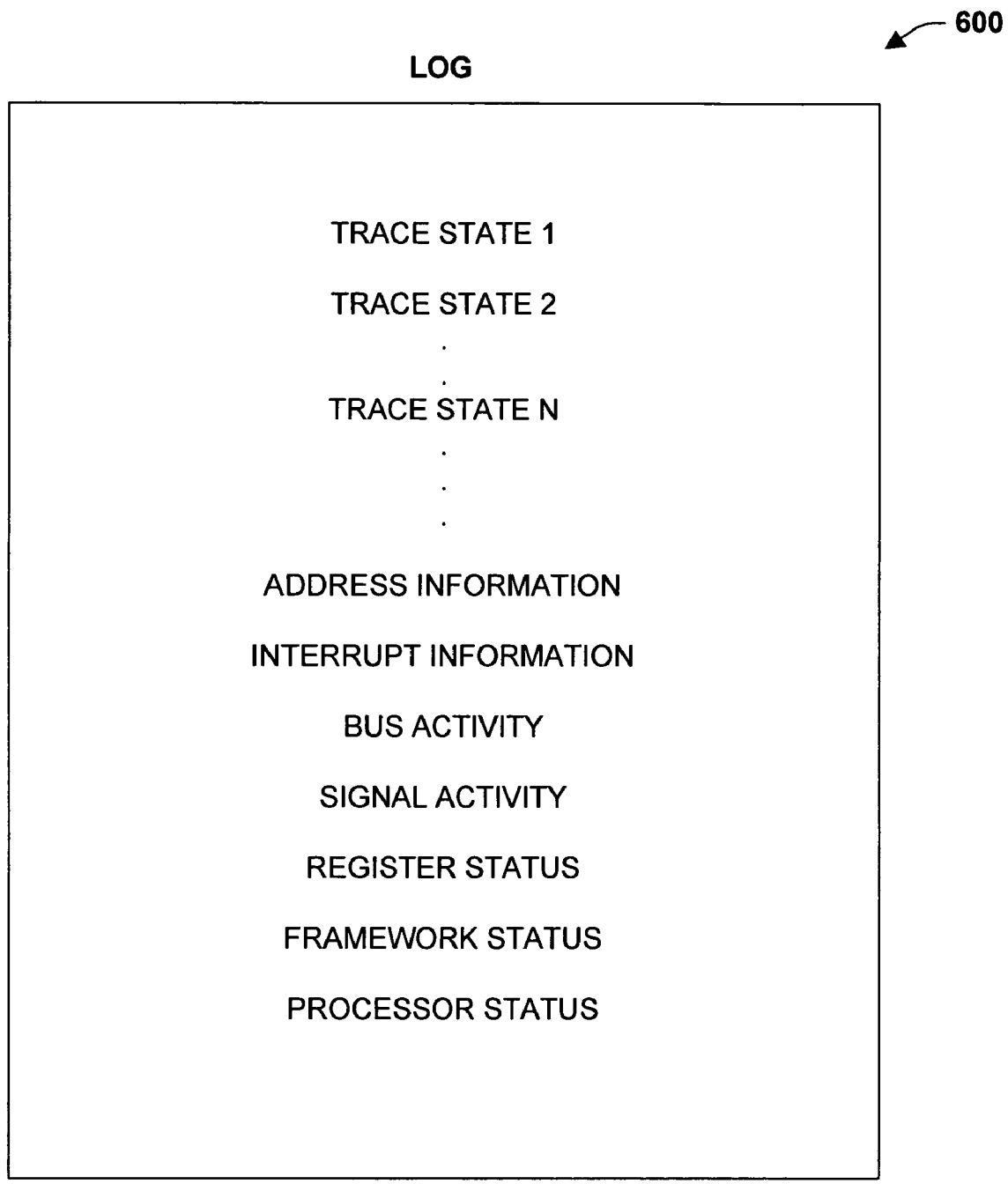
FIG. 6 illustrates an example log file for remote diagnostics in accordance with an aspect of the subject invention.

FIG. 6 illustrates an example log 600 for remote diagnostics in accordance with an aspect of the subject invention. The log 600 can include a plurality of differing types of information that have been previously captured and stored by the trace components described above. This can include one or more trace states that describe previous events or activities that may have happened in the failed system. These can include system or driver events or messages between the driver and operating system that can include other components such as a framework library that may be in place to support a respective driver. Along with the trace states captured in the log 600, other more detailed information may be captured. This can include such information as address information (e.g., locations where components or processes have failed or hung), interrupt information such as the last device or devices that generated a bus interrupt. This can include more detailed bus information such as what devices or busses may have been communicating in a particular context.

Other log 600 information may relate to hardware aspects such as signal activity (e.g., reset, power down, interrupt, and so forth), register information or status, and actual processor status (e.g., Processor clock speed is 1 Ghz, no external floating point processor is available). In another case, software component status can be provided such as revision level status of a framework component. As can be appreciated, substantially any type of activity that can be captured by the trace components described above can be recorded in the log for further analysis.

Figure 7:
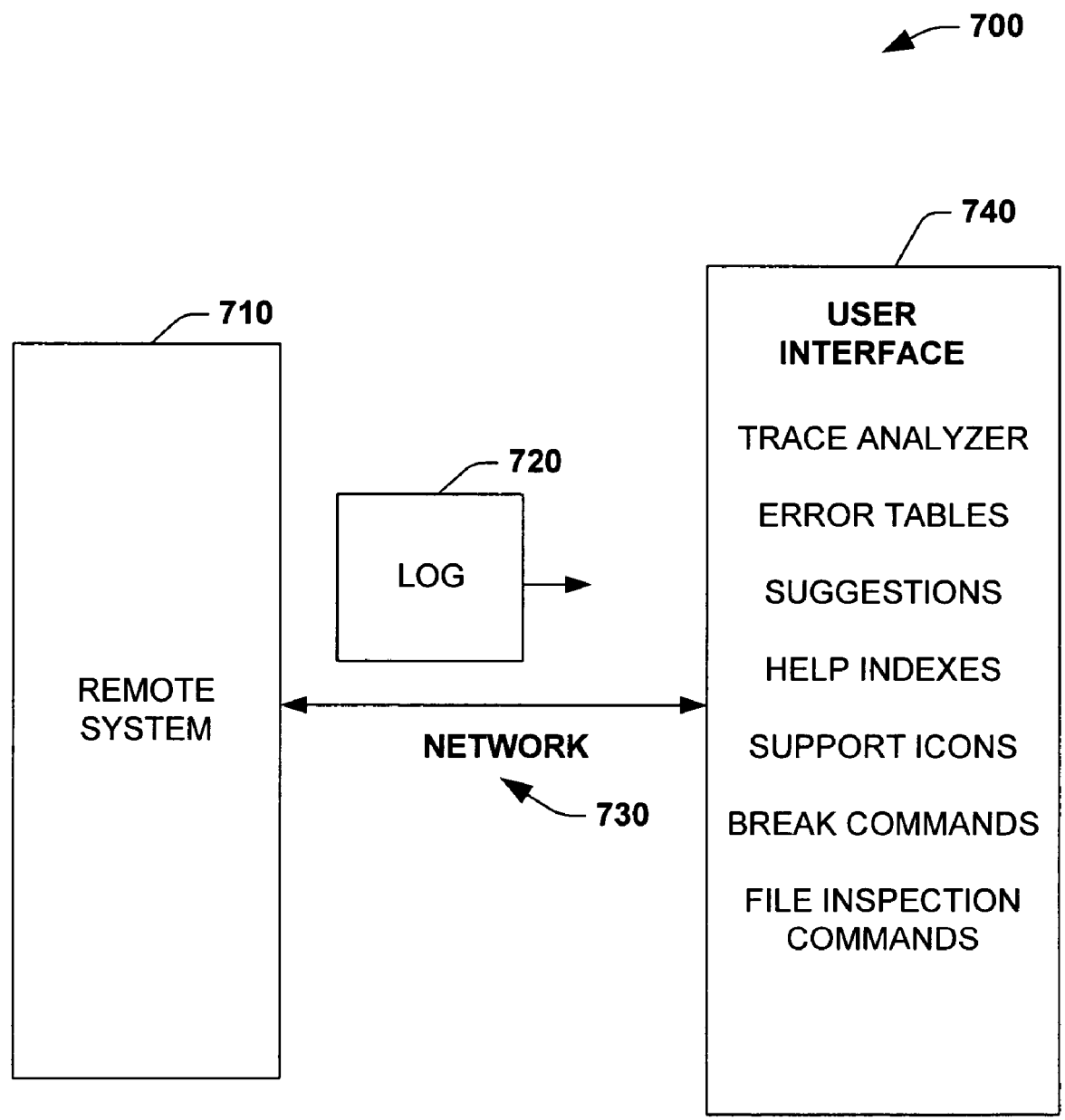
FIG. 7 illustrates an example diagnostic system and user interface in accordance with an aspect of the subject invention.

FIG. 7 illustrates an example diagnostic system 700 in accordance with an aspect of the subject invention. In this aspect, a remote computer system 710 that has experienced a failure or crash is analyzed via a log 720 that was generated in accordance with the driver or component trace aspects described above, whereby a trace component (not shown) operates during component execution and outputs captured activities to the log 720. As illustrated, the log 720 can be transferred over network 730 and subsequently analyzed by a computer system operating a user interface 740 to diagnose and subsequently repair problems related to the remote system failure. The network 730 that transmits the log 720 can be part of a local area network, wireless network, and/or public network such as the Internet, for example.

The user interface 740 can include various analytical aspects to inspect and diagnose the log 720. This can include output displays that display elements of the log 720 such as scrolling capabilities to analyze captured instructions or activities. Other components can cooperate with the display to perform trace analysis such as providing context or meaning for a particular instruction or subset of instructions (e.g., the displayed highlighted traces relate to a memory dump, the following two trace events show the system state before power down). Other aspects of the user interface include providing a display, listing, or tables that facilitate an understanding of error messages or codes that may appear in the log 720. Other features in the interface 740 can include providing automated help to the user by assisting in the analysis of the log 720. These can include providing automated suggestions based on the log 720, providing help indexes which can be adapted to the circumstances exhibited by the log, or providing support icons or numbers that can be selected to interact with a remote support web service or hotline, for example. In another case, the user interface 740 can send commands to the remote system to attempt further troubleshooting procedures. These may include sending breakpoint commands after the remote system is re-started and/or commands such as file inspection commands or register dump commands that can be acted upon by the trace components described above to transmit subsequent information to the user interface 740.

It is noted that the user interface 740 can be provided in various other different settings and context. As an example, the applications and/or components discussed herein can be associated with a desktop development tool, troubleshooting application, customer support application, and/or web browser, for example although other type applications can be utilized. These applications can be associated with a Graphical User Interface (GUI), wherein the GUI provides a display having one or more display objects (not shown) including such aspects as configurable icons, buttons, sliders, input boxes, selection options, menus, tabs and so forth having multiple configurable dimensions, shapes, colors, text, data and sounds to facilitate operations with the applications. In addition, the GUI and/or models can also include a plurality of other inputs or controls for adjusting and configuring one or more aspects of the subject invention. This can include receiving user commands from a mouse, keyboard, speech input, web site, remote web service, and/or other device such as a camera or video input to affect or modify operations of the GUI and/or processes described herein.

Figure 8:
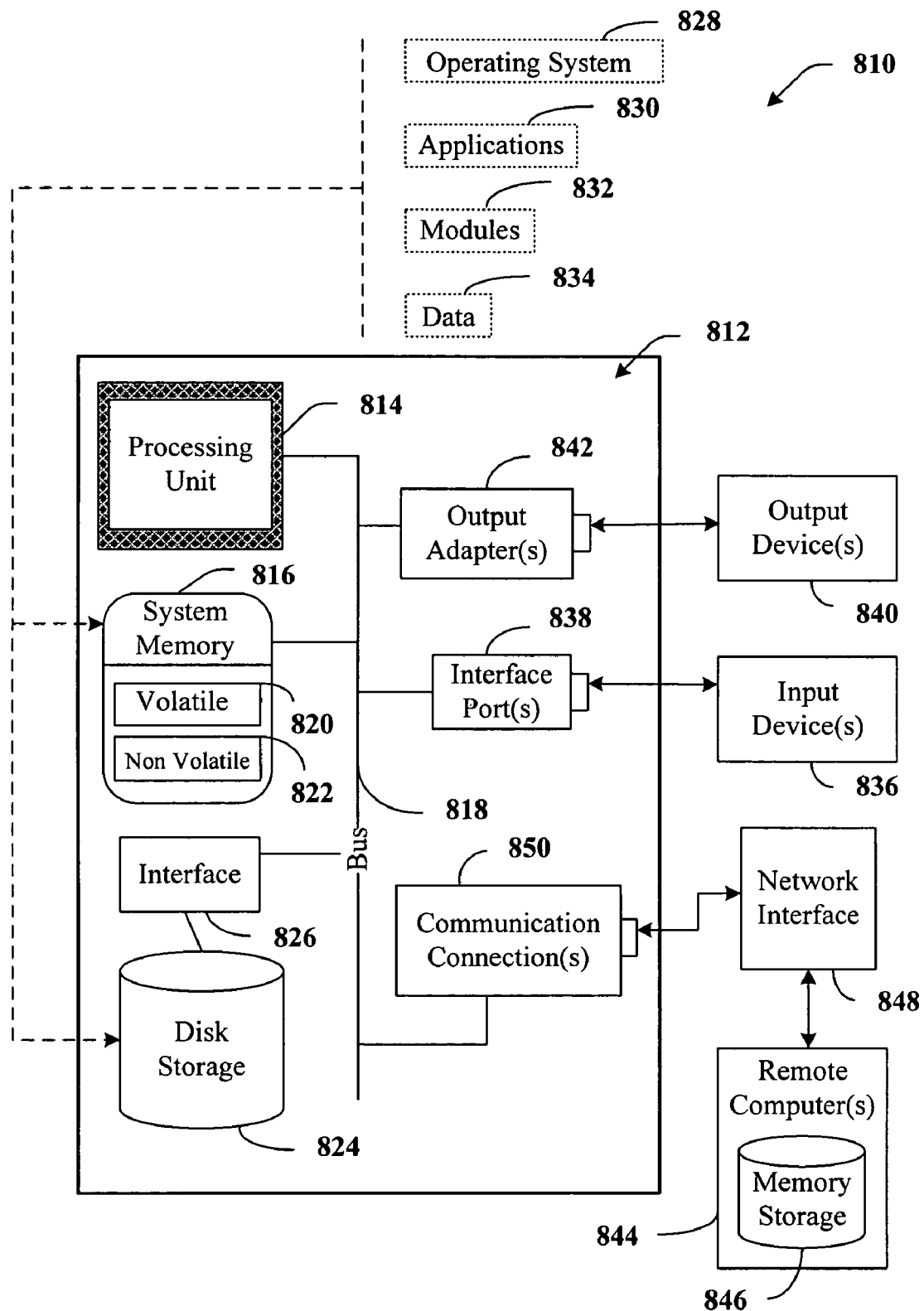
FIG. 8 is a schematic block diagram illustrating a suitable operating environment in accordance with an aspect of the subject invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
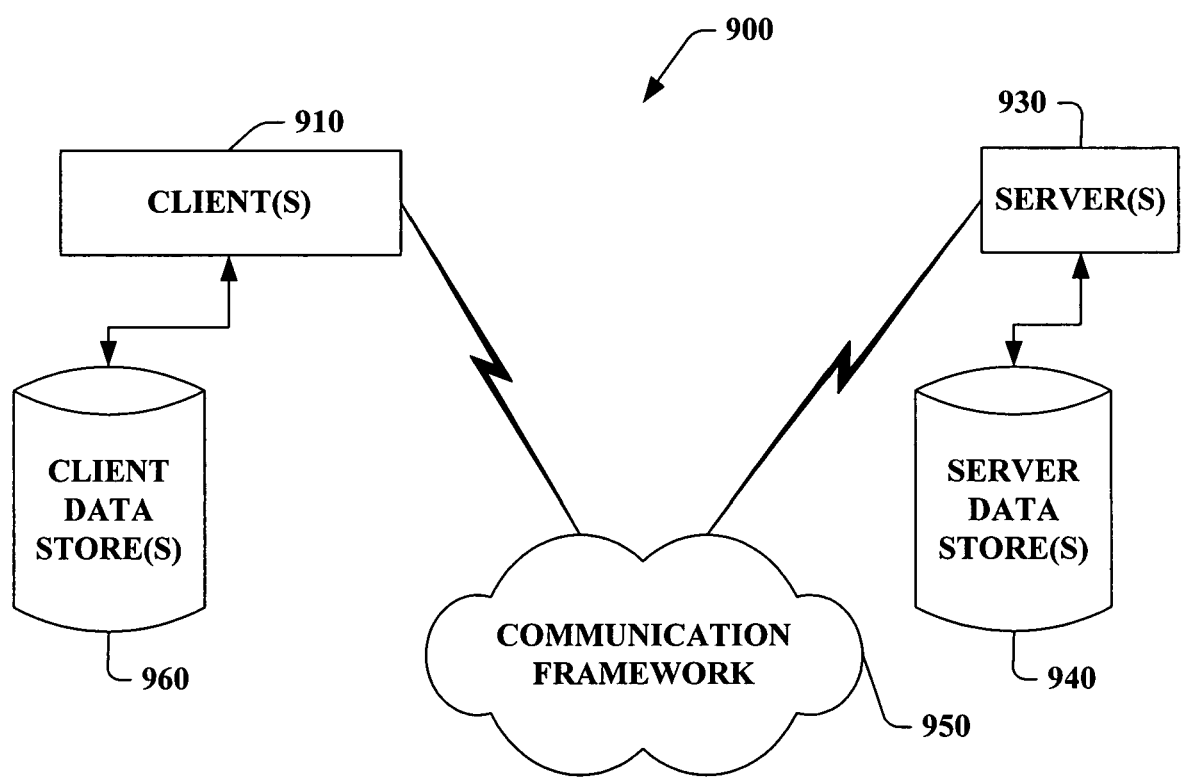
FIG. 9 is a schematic block diagram of a sample-computing environment with which the subject invention can interact.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the subject invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automated computer diagnostic system for use in a system comprising a plurality of drivers including at least a first driver, the automated computer diagnostic system comprising at least one processor programmed to implement:
   a trace component that monitors computer-related activities between the first driver and an operating system component, the trace component being embedded within the first driver and the monitoring occurring during operation of the first driver;
   a log that records indications of all of the computer-related activities to facilitate problem diagnosis with respect to the first driver, the log comprising a circular buffer in which older indications of computer-related activities are overwritten by newer indications of computer-related activities, the computer-related activities recorded by the log comprising one or more of a trace state, event, address, interrupt state, bus state, signal state, register status, framework status, and processor status; and
   a remote debugging system that, in the event of a failure of the first driver:
      automatically analyzes contents of the log, using one or more of automated error code analysis, statistical analysis and artificial intelligence analysis,
      provides a user interface that:
         presents, to a user based on content of the log, one or more of an automated suggestion, a help index, and contact information for a support service,
         sends, to the trace component for execution, one or more of breakpoint, file inspection and register dump commands,
         receives from the trace component a result generated by executing the one or more of breakpoint, file inspection and register dump commands, and
         presents to the user an indication of the received result,
      determines a cause of the failure, the cause comprising an inconsistency in code level revisions to the first driver and the operating system component, and
      repairs the determined cause of the failure, the repair comprising identifying a code update to the first driver to remove the inconsistency and transmitting the identified code update to the first driver.

2. The system of claim 1, the trace component is provided as an instruction that taps information from the operating system component.

3. The system of claim 1, the trace component operates in parallel with at least one other trace component adapted for the operating system component.

4. The system of claim 1, wherein the user interface includes at least one of a trace analyzer, an error code table or listing, a suggestion display, a help index, a support icon, a support number, and controls for at least one of a break command or a file inspection command.

5. The system of claim 1, the remote debugging system includes one or more automated procedures to diagnose a system or driver failure or to repair a system or driver failure.

6. The system of claim 1, the log is provided as part of a system crash dump of information or as part of a miniature dump of information.

7. A computer readable medium having computer-readable instructions stored thereon for implementing the components of claim 1.

8. A method for capturing diagnostic information for use in a computer system comprising a plurality of drivers including at least a first driver, the method comprising:
   employing a processor executing computer-executable instructions stored on a computer-readable storage medium to perform acts comprising:
      embedding a trace recording element within the first driver to monitor activities between the first driver and an operating system component, the monitoring occurring during operation of the first driver;
      interfacing the trace recording element with an operating system;
      logging indications of all of the activities monitored by the trace recording element to an analysis file, the analysis file comprising a circular buffer in which older indications of activities are overwritten by newer indications of activities, the output recorded in the analysis file comprising one or more of a trace state, event, address, interrupt state, bus state, signal state, register status, framework status, and processor status;
      upon a failure of the first driver or the operating system, automatically analyzing contents of the log, using one or more of automated error code analysis, statistical analysis and artificial intelligence analysis;
      providing a user interface that:
         presents, to a user based on the content of the analysis file, one or more of an automated suggestion, a help index, and contact information for a support service,
         sends, to the trace recording element for execution, one or more of breakpoint, file inspection and register dump commands,
         receives from the trace recording element a result generated by executing the one or more of breakpoint, file inspection and register dump commands, and
         presents to the user an indication of the received result,
      determining a cause of the failure, the cause comprising an inconsistency in code level revisions to the first driver and the operating system component, and
      repairs the determined cause of the failure, the repair comprising identifying a code update to the first driver to remove the inconsistency and transmitting the identified code update to the first driver.

9. The method of claim 8, further comprising automatically transmitting the analysis file to a debugging station.

10. The method of claim 8, further comprising automatically responding to at least one event contained in the analysis file.

11. The method of claim 10, further comprising applying a statistical or learning function to respond to the event.

12. A system to facilitate computer diagnostic operations for use in a computer system comprising a plurality of driver components including at least a first driver component, the system comprising at least one processor programmed to implement:

means for tracing activities of the first driver component interfacing with an operating system, the means for tracing being embedded within the first driver and the tracing occurring during operation of the first driver;

means for interfacing the driver component to a log;

means for recording indications of all of the activities of the first driver to the log, the log comprising a circular buffer in which older records of activities are overwritten by newer records of activities, the log recording activities comprising one or more of a trace state, event, address, interrupt state, bus state, signal state, register status, framework status, and processor status;

means for interfacing the first driver component to a computer library component;

means for transmitting the log to a remote debugging system in the event of a first driver failure;

means for automatically analyzing contents of the log, using one or more of automated error code analysis, statistical analysis and artificial intelligence analysis, to diagnose a cause of the first driver failure, means for presenting a user interface that:
        presents, to a user based on content of the log, one or more of an automated suggestion, a help index, and contact information for a support service,
        sends, to the means for tracing for execution, one or more of breakpoint, file inspection and register dump commands,
        receives, from the means for tracing, a result generated by executing the one or more of breakpoint, file inspection and register dump commands, and
        presents to the user an indication of the received result, means for determining the cause as comprising an inconsistency in code level revisions to the first driver and the operating system; and means for receiving a corrective measure from the remote debugging system, the corrective measure comprising a code update to the first driver identified by the remote debugging system to remove the inconsistency in code level revisions.

13. The system of claim 12, further comprising means for applying a statistical or learning function to respond to the driver failure.

\* \* \* \* \*